(12) United States Patent
Sera

(10) Patent No.: US 9,976,581 B2
(45) Date of Patent: May 22, 2018

(54) FLUID TRANSPORT APPARATUS, METHOD FOR CONTROLLING THE SAME, AND CHEMICAL SYNTHESIS APPARATUS

(71) Applicant: Seiko Epson Corporation, Tokyo (JP)

(72) Inventor: Hiroshi Sera, Chino (JP)

(73) Assignee: Seiko Epson Corporation (JP)

( * ) Notice: Subject to any disclaimer, the term of this patent is extended or adjusted under 35 U.S.C. 154(b) by 68 days.

(21) Appl. No.: 15/155,362

(22) Filed: May 16, 2016

(65) Prior Publication Data
US 2016/0339408 A1    Nov. 24, 2016

(30) Foreign Application Priority Data

May 19, 2015  (JP) .................................. 2015-101621

(51) Int. Cl.
*B01J 19/00*     (2006.01)
*F15D 1/00*      (2006.01)
*F15D 1/02*      (2006.01)

(52) U.S. Cl.
CPC ............ *F15D 1/02* (2013.01); *B01J 19/0093* (2013.01); *B01J 2219/009* (2013.01); *B01J 2219/00783* (2013.01); *B01J 2219/00813* (2013.01); *B01J 2219/00817* (2013.01); *B01J 2219/00891* (2013.01); *B01J 2219/00963* (2013.01)

(58) Field of Classification Search
CPC ................... B01J 19/00; B01J 19/0093; B01J 2219/00781; B01J 2219/00783; B01J 2219/00801; B01J 2219/0081; B01J 2219/00813; B01J 2219/00817; B01J 2219/00891; B01J 2219/009; B01J 2219/0095–2219/00954; B01J 2219/00963; F15D 1/00; F15D 1/02
See application file for complete search history.

(56) References Cited

FOREIGN PATENT DOCUMENTS

| JP | 2007-009726 A | 1/2007 |
|----|---------------|--------|
| JP | 2011-122858 A | 6/2011 |
| JP | 2014-176931 A | 9/2014 |

*Primary Examiner* — Natasha E Young
(74) *Attorney, Agent, or Firm* — Harness, Dickey & Pierce, P.L.C.

(57) ABSTRACT

A fluid transport apparatus includes a pressure chamber to which a fluid is supplied, N drive elements that deliver the fluid to a channel by changing pressure of the fluid within the pressure chamber, and a control section that supplies a drive signal to each of the drive elements. The control section controls the N (N≥2) drive elements such that phases of drive signals which are supplied to each of the drive elements are different from each other. Therefore, by changing the pressure of the fluid within the pressure chamber while suppressing an amplitude of the drive elements as a whole, pulsation of the fluid is effectively suppressed.

9 Claims, 6 Drawing Sheets

FLUID TRANSPORT APPARATUS, METHOD FOR CONTROLLING THE SAME, AND CHEMICAL SYNTHESIS APPARATUS

This application claims priority to Japanese Patent Application No. 2015-101621 filed on May 19, 2015 which is hereby expressly incorporated by reference in its entirety.

BACKGROUND

1. Technical Field

Several aspects of the present invention relate to a fluid transport apparatus, a method for controlling the same, and a chemical synthesis apparatus.

2. Related Art

In the related art, for example, a micro-reactor has been used as an apparatus that performs a chemical reaction by mixing a plurality of fluids such as samples or reagents in a space of which one side is several centimeters or less. As a simple micro-reactor, there is a case where a channel is formed by carving a very small groove into a T shape on a plate. The channel includes two inflow paths into which two reagents are respectively introduced, and one outflow path, in which the reagents that are respectively introduced into the two inflow paths join with each other, and are guided to the outflow path. Each reagent is delivered to the inflow path by a pump which is driven by a piezoelectric element or the like. As such a pump using the piezoelectric element, for example, there is a case disclosed in JP-A-2011-122858. JP-A-2011-122858 discloses a chemical analysis chip in which a pump chamber formed in a channel of a fluid is divided into three circular areas along the channel, and a piezoelectric element of a thin film is disposed in each of the circular areas. In the chemical analysis chip, three circular areas of the pump chamber are respectively contracted in sequence along the channel by curving the piezoelectric element in a thickness direction. In this manner, the fluid is transported by transferring the fluid one after another in each area.

In such a configuration of JP-A-2011-122858, since three circular areas of the pump chamber are contracted in sequence along the channel by the piezoelectric element, pulsation may occur in the fluid. As the pulsation of the fluid is large, accuracy in flow rate control of the fluid may be lowered. In this regard, JP-A-2011-122858 discloses that by making the piezoelectric element driving the pump into a thin film, a resonance frequency is enhanced in comparison with a case where the piezoelectric element of a thick film is used, thereby suppressing the pulsation of the fluid due to the pump. However, as described above, in the configuration of JP-A-2011-122858, since the piezoelectric elements are respectively driven in sequence so as to transfer the fluid in sequence of three circular areas, in the same manner as a case where a plurality of pumps are disposed side by side and are driven in sequence, it is not possible to suppress even the pulsation of the fluid due to displacement in an amplitude direction (thickness direction) of each piezoelectric element.

SUMMARY

An advantage of some aspects of the invention is to effectively suppress pulsation of a fluid, and to enhance accuracy in flow rate control of the fluid.

A fluid transport apparatus according to an aspect of the invention includes a pressure chamber to which a fluid is supplied, a plurality of drive elements that deliver the fluid to a channel by changing pressure of the fluid within the pressure chamber, and a control section that supplies a drive signal to each of the plurality of drive elements, in which phases of drive signals which are supplied to each of N (N≥2) drive elements among the plurality of drive elements are different from each other.

According to such a configuration, the drive signal is supplied to each of the plurality of drive elements by the control section, and the fluid within the pressure chamber is delivered to the channel by changing the pressure of the fluid within the pressure chamber. Each of the N drive elements repeats displacement in a direction pressurizing the pressure chamber, and displacement in a reverse direction thereof depending on an amplitude of the drive signal. At this time, since the phases of the drive signals which are supplied to each of the N (N≥2) drive elements are different from each other, the following drive element is displaced in the direction pressurizing the pressure chamber during each of the N drive elements is displaced in the reverse direction after being displaced in the direction pressurizing the pressure chamber. In this manner, since the drive elements are displaced one after another in the direction pressurizing the pressure chamber, it is possible to effectively suppress pulsation of the fluid while suppressing the amplitude. Thereby, since it is possible to perform a flow rate control of the fluid while suppressing an influence of the pulsation of the fluid, it is possible to enhance accuracy in flow rate control. In the aspect of the invention, regardless of a film thickness of the drive element, it is possible to effectively suppress the pulsation of the fluid due to the displacement in an amplitude direction of the drive element.

In a preferred aspect of the invention, a phase difference between the drive signals which are supplied to each of the N drive elements is a half cycle or less in cycles that are equal to each other. According to this aspect, it is possible to pressurize the pressure chamber by the following drive element within a half cycle, after each of the N drive elements is displaced in the direction pressuring the pressure chamber. In this manner, by quickening the switching of the drive element, it is possible to enhance an effect of suppressing the pulsation of the fluid.

In a preferred aspect of the invention, phases of the drive signals which are supplied to each of three or more drive elements among the plurality of drive elements are different from each other by the same phase differences. According to this aspect, since it is possible to suppress the change uniformly when the drive elements which are displaced in the direction pressurizing the pressure chamber are switched to each other, it is possible to enhance the effect of suppressing the pulsation of the fluid.

In a preferred aspect of the invention, the control section controls a flow rate of the fluid which is delivered to the channel from the pressure chamber by changing an amplitude of the drive signal. According to this aspect, it is possible to control the flow rate of the fluid by only a simple control such as changing the amplitude.

In a preferred aspect of the invention, the number of drive elements which are included in the plurality of drive elements is more than N, and two or more drive elements to which a common drive signal is supplied are present among the plurality of drive elements. According to this aspect, by driving even more drive elements by the common drive signal, it is possible to enhance a pressurization effect of the pressure chamber.

In a preferred aspect of the invention, the fluid transport apparatus further includes a first substrate where the channel is formed, and a second substrate where the pressure chamber is formed, in which the channel and the pressure chamber communicate with each other by superimposing the first substrate and the second substrate. According to this aspect, it is possible to achieve miniaturization of the apparatus.

In a preferred aspect of the invention, the channel is extended in one direction, and the plurality of drive elements are arrayed along a direction of the channel on the pressure chamber, and are extended in a direction intersecting with (perpendicular or oblique to) the channel. According to this aspect, since the plurality of drive elements are arranged so as to intersect with the channel, it is possible to efficiently deliver the fluid to the channel.

A chemical synthesis apparatus according to another aspect of the invention includes a plurality of fluid passage sections that include a pressure chamber to which a fluid is supplied, and a plurality of drive elements which deliver the fluid to a channel by changing pressure of the fluid within the pressure chamber, a synthesis channel at which the channels of the plurality of fluid passage sections join with each other, and a control section that supplies a drive signal to the plurality of drive elements in each of the plurality of fluid passage sections, in which in each of the plurality of fluid passage sections, phases of drive signals which are supplied to each of N (N≥2) drive elements among the plurality of drive elements are different from each other. According to this aspect, since it is possible to perform the flow rate control of the fluid while suppressing the influence of the pulsation of the fluid, it is possible to enhance the accuracy in flow rate control.

A method for controlling a fluid transport apparatus is a method for controlling a fluid transport apparatus including a channel through which a fluid is transported, in which the fluid transport apparatus includes a pressure chamber to which a fluid is supplied, and a plurality of drive elements that deliver the fluid to the channel by changing pressure of the fluid within the pressure chamber, the method including supplying a drive signal to each of the drive elements such that phases of drive signals which are supplied to each of N (N≥2) drive elements among the plurality of drive elements are different from each other. According to this aspect, since it is possible to perform the flow rate control of the fluid while suppressing the influence of the pulsation of the fluid, it is possible to enhance the accuracy in flow rate control.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a chemical synthesis apparatus according to an embodiment of the invention will be described with reference to the drawings. The scope of the invention is not limited to the following embodiments, and may be optionally changed within the scope of technical ideas of the invention. In the following drawings, a scale or a number of each structure may be different from that of an actual structure, in order to easily recognize each configuration.

Chemical Synthesis Apparatus

Figure 1:
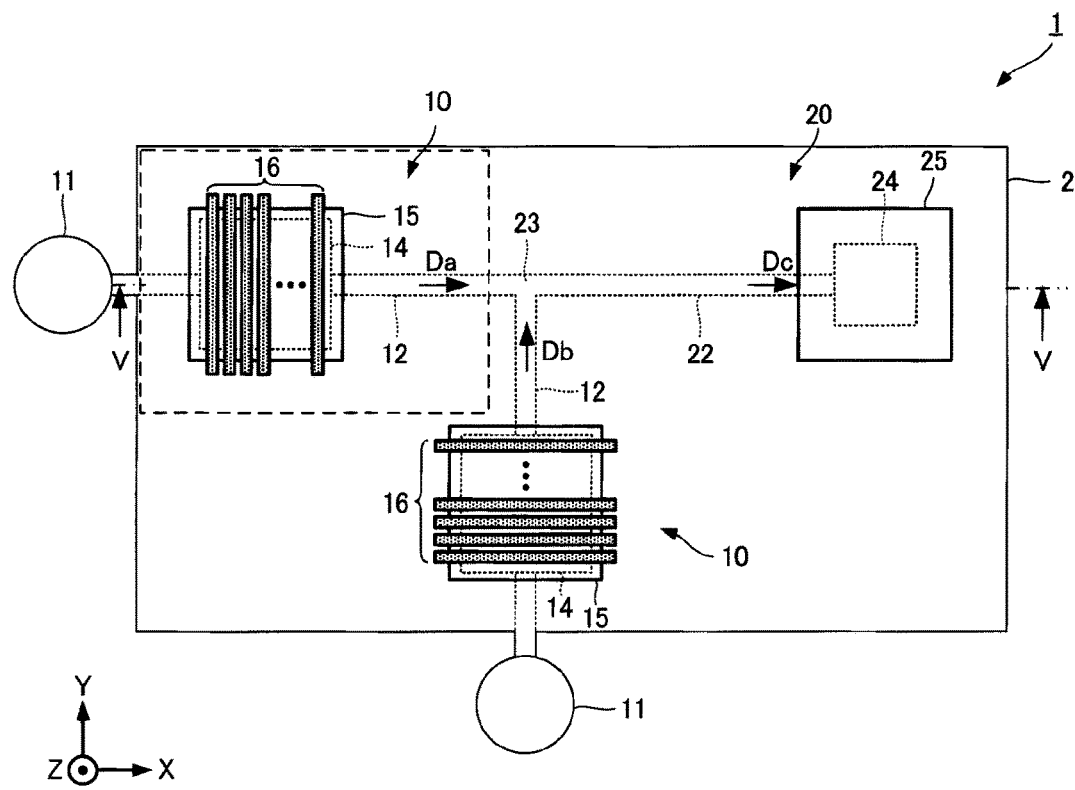
FIG. 1 is a plan view illustrating a configuration of a chemical synthesis apparatus according to an embodiment of the invention.
Figure 2:
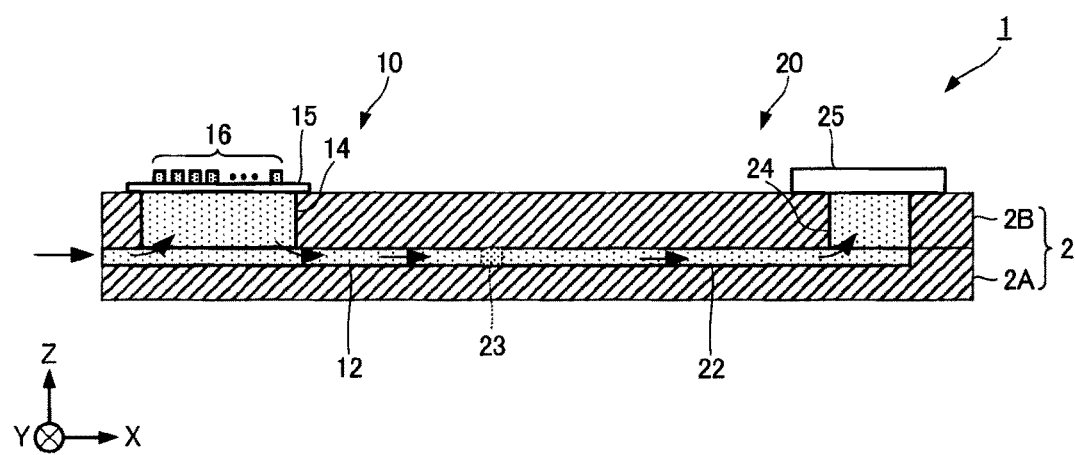
FIG. 2 is a sectional view of the chemical synthesis apparatus illustrated in FIG. 1 that is taken along V-V line.
Figure 3:
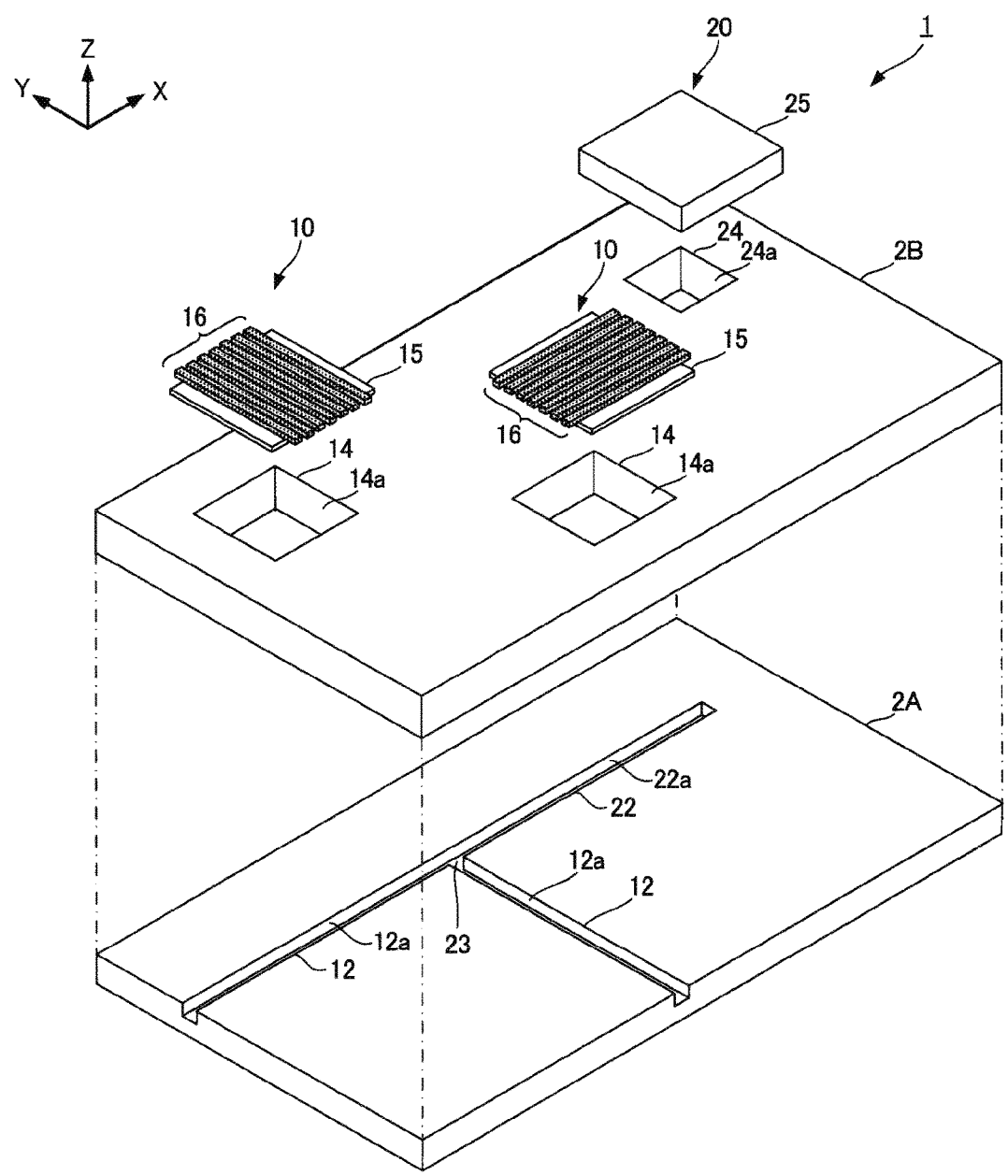
FIG. 3 is an exploded perspective view of the chemical synthesis apparatus illustrated in FIG. 1.

First, the chemical synthesis apparatus according to the embodiment of the invention will be described. The chemical synthesis apparatus described herein is an apparatus that obtains a product substance (fluid) Dc which is generated by performing a chemical synthesis with a mixture of two types of fluids Da and Db such as reagents. The fluid may be a liquid or a gas, but here, a case where two types of liquids are mixed with each other, and a product substance of the liquids is obtained is used as an example. FIG. 1 is a plan view illustrating a configuration of a chemical synthesis apparatus 1 according to the embodiment, and FIG. 2 is a sectional view of the chemical synthesis apparatus 1 taken along V-V line, and FIG. 3 is an exploded perspective view of the chemical synthesis apparatus 1 illustrated in FIG. 1. In the following description, an XYZ coordinate system is set thereto, and a positional relationship between the respective components will be described while referring to the XYZ coordinate system. At this time, a Z-axis direction denotes a normal direction of a substrate 2, and a Y-axis direction denotes a width direction of the substrate 2, and an X-axis direction denotes a length direction of the substrate 2.

The chemical synthesis apparatus 1 illustrated in FIG. 1 includes a plurality (here, two) of fluid passage sections 10 and 10, and a fluid synthesizing section 20. The fluids Da and Db which are introduced into the chemical synthesis apparatus 1 are respectively transported to the respective fluid passage sections 10 and 10, and are chemically synthesized in the fluid synthesizing section 20, thereby obtaining the product substance (fluid) Dc.

The respective fluid passage sections 10 and 10 are configured in the same manner. The fluid passage section 10 includes a channel 12 for transporting the fluid which is introduced into the chemical synthesis apparatus 1, a pressure chamber 14 to which the fluid is supplied from a pump 11, and a plurality of drive elements 16 that deliver the fluid to the channel 12 by chaining pressure of the fluid within the pressure chamber 14. The plurality of drive elements 16 are formed into a long belt shape throughout the entire width of the pressure chamber 14 in a planar view (XY plane view), and are arrayed at intervals in a direction (direction of the later channel 12) intersecting with each longitudinal direction. The fluid synthesizing section 20 includes a channel 22 where the channels 12 of the respective fluid passage sections 10 join with each other, and a discharge port 24 that is connected to the channel 22, and a discharge apparatus 25 that is disposed at the discharge port 24.

Each drive element 16 of the fluid passage section 10 is disposed on an upper surface of a flexible elastic member 15 configuring a portion of a wall surface of the pressure chamber 14. Thereby, it is possible to deform the elastic member 15 even in a case where any drive element 16 is driven among the plurality of drive elements 16. Here, for example, the drive element 16 is configured of a piezoelectric element such as a micro-piezo element. However, the drive element 16 is not limited to the piezoelectric element, and for example, it is possible to use a vibration object such as an electrostatic actuator as a drive element. In the embodiment, the elastic member 15 is deformed by driving each drive element 16 at a predetermined timing, thereby pressurizing the fluid within the pressure chamber 14. Therefore, the fluid within the pressure chamber 14 may be delivered to the channel 12 while suppressing pulsation. Furthermore, a control such as an operation timing of each drive element 16 will be described later.

The chemical synthesis apparatus 1 is configured by superimposing a plurality of substrates 2 of rectangular shapes in the planar view (XY plane view), and the respective fluid passage sections 10 and 10, and the fluid synthesizing section 20 are respectively formed on the substrates 2. By such a configuration, it is possible to achieve miniaturization of the apparatus. The shape of the substrate 2 is not particularly limited. Moreover, the substrate 2 is configured of a transparent glass substrate. In this manner, the substrate 2 is made transparent, and thus, it is possible to observe a reaction state or a product substance, for example, by using spectroscopy. It is possible to observe a leakage or a reaction process of the fluid by sight or a spectroscope. Furthermore, if the substrate 2 is transparent, it is also possible to cause a photoreaction. Moreover, the substrate 2 may not be transparent, and may use a material other than the glass substrate.

Specifically, as illustrated in FIG. 2 and FIG. 3, the chemical synthesis apparatus 1 is configured of two sheets of a first substrate 2A and a second substrate 2B which are vertically superimposed. On the first substrate 2A of the lower side, grooves 12a and 12a which respectively configure the channels 12 and 12 of the respective fluid passage sections 10 and 10, and a groove 22a which configures the channel 22 of the fluid synthesizing section 20 are formed. For example, the grooves 12a and 12a, and the groove 22a may be formed on the first substrate 2A by wet etching or dry etching.

Upper surfaces of the grooves 12a and 12a and the groove 22a are open, and the opening of the upper surface is closed by a lower surface of the second substrate 2B. Thereby, an internal space which is surrounded by the grooves 12a and 12a, the groove 22a, and the lower surface of the second substrate 2B is formed. The internal space becomes the channels 12 and 12 of the respective fluid passage sections 10 and 10, and the channel 22 of the fluid synthesizing section 20. For example, widths and heights of the channels 12 and 12, and the channel 22 are 1 mm or less (channel area is 1 mm$^2$ or less). However, the widths and the heights of the channels 12 and 12, and the channel 22 are not limited thereto, and may be several mm or less, or may be several cm or less. In this case, width dimensions of the channels 12 and 12, and the channel 22 may be larger than height dimensions thereof. According to this, it is easy to confirm a state of a laminar flow of the fluid flowing through the respective channels 12 and 12, and the channel 22. Although not being illustrated, a space between the first substrate 2A and the second substrate 2B is sealed by a sealing member so that the fluid does not leak from the respective channels 12 and 12, and the channel 22.

In the chemical synthesis apparatus 1 of the embodiment, the channel 12 of one fluid passage section 10 is formed so as to be extended in the X-axis direction, and the channel 12 of the other fluid passage section 10 is formed so as to be extended in the Y-axis direction. The channels 12 and 12 join with each other in a joining section 23, and communicate with the channel 22 of the fluid synthesizing section 20 which is extended in the X-axis direction to a downstream side from the joining section 23. Such an arrangement of the respective channels is not limited to the arranged illustrated in the drawings.

On the second substrate 2B, through holes 14a and 14a which configure the pressure chambers 14 and 14 of the respective fluid passage sections 10 and 10, and a through hole 24a which configures the discharge port 24 are formed. For example, the through holes 14a and 14a, and the through hole 24a may be formed on the second substrate 2B by wet etching or dry etching.

The respective through-holes 14a and 14a are respectively formed above the grooves 12a and 12a which configure the channels 12 and 12 of the respective fluid passage sections 10 and 10. The through hole 24a is formed above the groove 22a which configures the channel 22 of the fluid synthesizing section 20. According to this, by superimposing the second substrate 2B on the upper surface of the first substrate 2A, the through holes 14a and 14a communicate with the grooves 12a and 12a which are respectively arranged below the through holes 14a and 14a, and the through hole 24a communicates with the groove 22a which is arranged below the through hole 24a. Thereby, the pressure chambers 14 and 14 communicating with the respective channels 12 and 12 are respectively formed, and the discharge port 24 communicating with the channel 22 is formed.

The elastic members 15 and 15 having flexibility are respectively attached to the openings of the upper surfaces of the respective pressure chambers 14 and 14, so as to close the openings. In this manner, the elastic members 15 and 15 are arranged so as to configure the upper surfaces (wall surface) of the respective pressure chambers 14 and 14. On the upper surfaces of the respective elastic members 15 and 15, the plurality of drive elements 16 and 16 are arranged. The discharge apparatus 25 is attached to the opening of the upper surface of the discharge port 24.

According to the chemical synthesis apparatus 1 of the above configuration, the fluids Da and Db flowing through the channels 12 and 12 of the respective fluid passage sections 10 and 10 join with each other in the joining section 23 of the fluid synthesizing section 20, and are chemically synthesized, thereby generating the product substance Dc. The product substance Dc flows to the discharge port 24 through the channel 22 of the fluid synthesizing section 20, and is discharged by the discharge apparatus 25.

In the respective fluid passage sections 10 and 10, the fluids Da and Db are respectively supplied to the pressure chambers 14 and 14 by the pumps 11 and 11. The elastic members 15 and 15 are deformed by driving the respective drive elements 16 and 16, and the pressure within the pressure chambers 14 and 14 is changed. Thereby, the fluids Da and Db are respectively delivered to the channels 12 and 12 of the respective fluid passage sections 10 and 10.

At this time, if the fluid is delivered to the channel 12 by only the pump 11, the pulsation due to the operation of the pump 11 occurs in the fluid flowing through the channel 12. If the pulsation of the fluid flowing through the channel 12 is large, there is a concern that a flow rate of the fluid may not be accurately controlled. In the embodiment, the timing for operating the drive element 16 is studied, thereby suppressing the pulsation of the fluid which is delivered to the channel 12.

Fluid Passage Section (Fluid Transport Apparatus)

Figure 4:
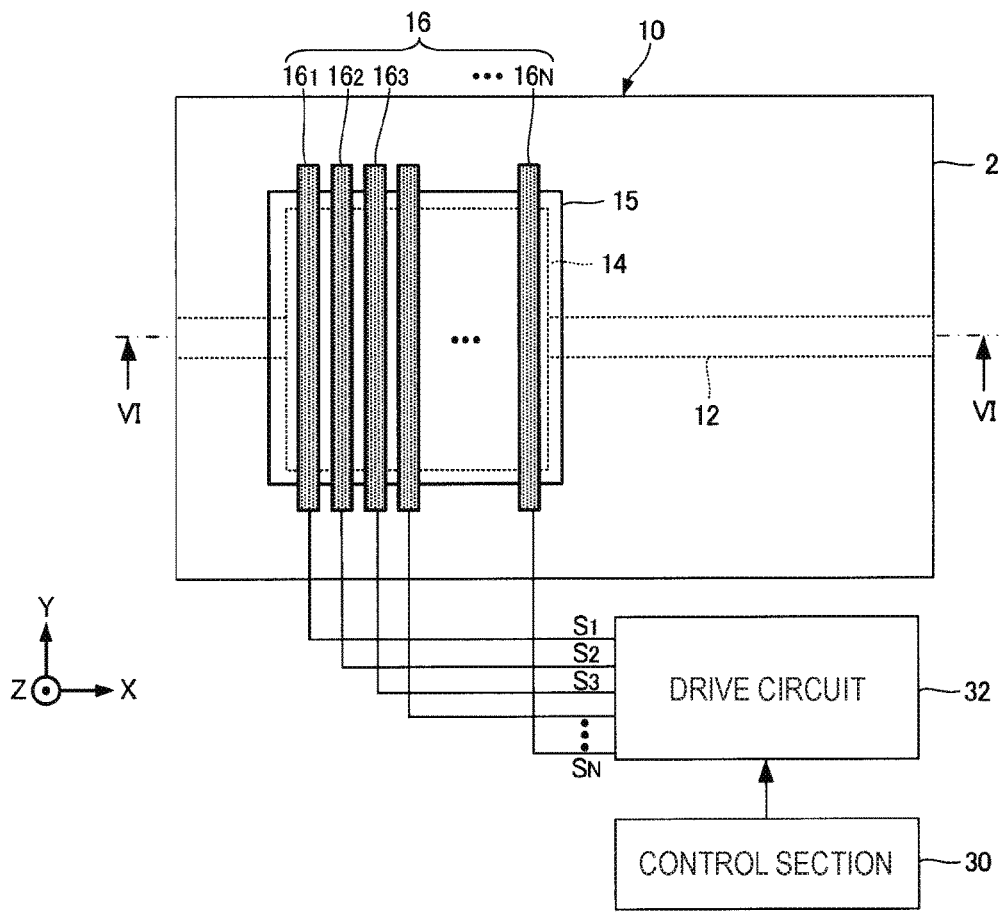
FIG. 4 is a plan view of a fluid passage section (fluid transport apparatus) illustrated in FIG. 1 in a case of being enlarged.
Figure 5:
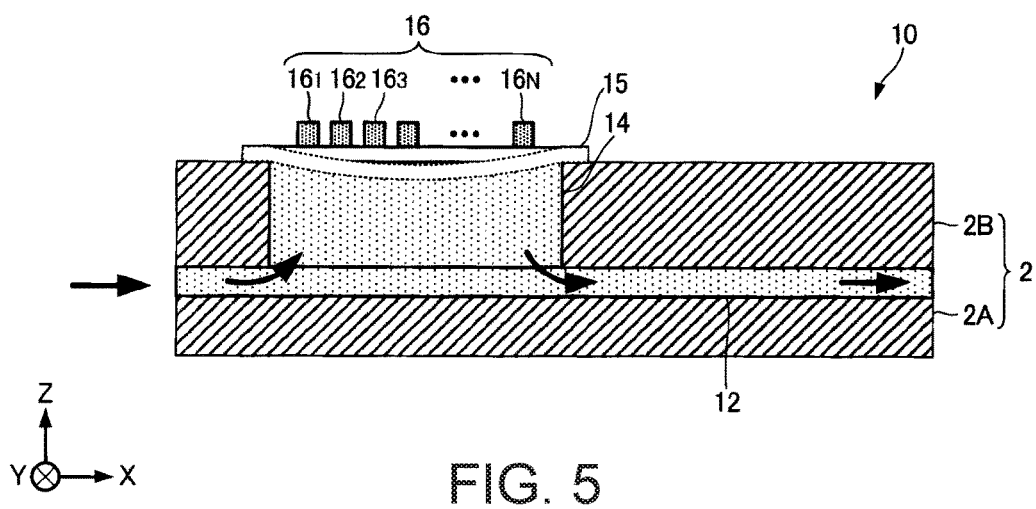
FIG. 5 is a sectional view of the fluid passage section illustrated in FIG. 4 that is taken along VI-VI line.

Hereinafter, the configurations of the fluid passage sections 10 and 10 will be more specifically described. In the embodiment, since the fluid passage sections 10 and 10 are configured in the same manner, and here, the configuration of one fluid passage section 10 will be described as a representative example. FIG. 4 is a plan view of the fluid passage section 10 that is surrounded by a dotted line illustrated in FIG. 1 in a case of being enlarged. FIG. 5 is a sectional view of the fluid passage section 10 illustrated in FIG. 4 that is taken along VI-VI line.

The drive element 16 illustrated in FIG. 4 is configured of N (N≥2) drive elements 161, 162, . . . , and 16N (first drive element 161, second drive element 162, . . . , and N-th drive element 16N). A drive circuit 32 is connected to the drive elements 161, 162, . . . and 16N. The drive circuit 32 is controlled by a control section 30. The control section 30 includes a CPU, a ROM, a RAM and the like, and controls the respective components of the chemical synthesis apparatus 1 overall.

The control section 30 respectively supplies drive signals S1, S2, . . . , and SN (first drive signal S1, second drive signal S2, . . . , and N-th drive signal SN) to the respective drive elements 161, 162, . . . , and 16N separately from the drive circuit 32. Without disposing the drive circuit 32, the drive signals S1, S2, . . . , and SN may be configured so as to be supplied directly to the respective drive elements 161, 162, . . . and 16N from the control section 30. In the embodiment, phases of the respective drive signals S1, S2, . . . , and SN are different from each other, the pressure within the pressure chamber 14 is changed, and thereby, it is possible to effectively suppress the pulsation of the fluid which is delivered to the channel 12.

Figure 6:
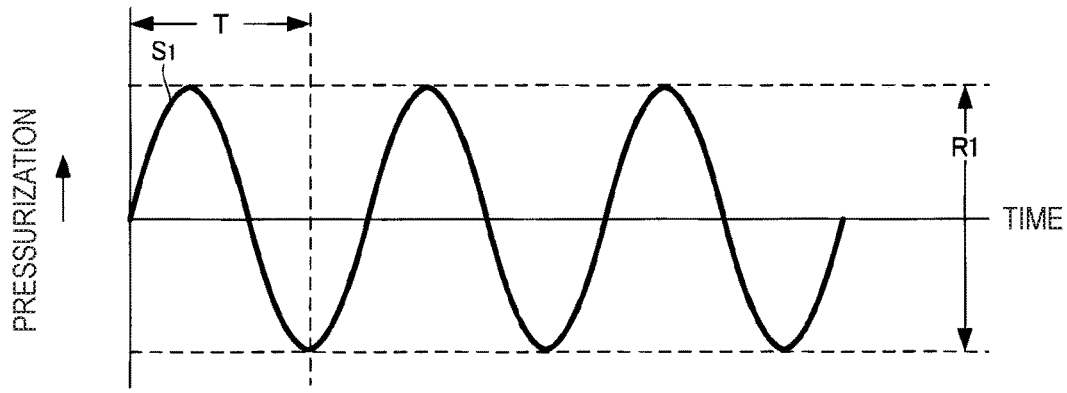
FIG. 6 is a diagram for describing one drive signal.

FIG. 6 is a specific example of one drive signal S1 which is supplied from the drive circuit 32. In FIG. 6, a horizontal axis denotes the time, and a vertical axis denotes an amplitude. A positive direction of the vertical axis is a direction in which the elastic member 15 pressurizes the fluid in the inner portion of the pressure chamber 14. The drive signal S1 as illustrated in FIG. 6 has a waveform (for example, sine wave) of a cycle T and an amplitude R1. In the embodiment, all of other signals S2, S3, . . . , and SN have the same cycles T and the same amplitudes R1. However, the signals are not limited thereto, and the cycles T and the amplitudes R1 of the drive signals S1, S2, . . . , and SN may be changed.

In the embodiment, since the drive element 16 is arranged on the upper surface of the elastic member 15, for example, if the drive element 161 is controlled by the drive signal S1, depending on the amplitude R1 of the waveform of the drive signal S1, the elastic member 15 is deformed in a direction pressurizing the pressure chamber 14, and a reverse direction thereof as illustrated in FIG. 5. In FIG. 5, the direction pressurizing the pressure chamber 14 denotes the positive direction of the vertical axis. Other cases of the respective drive signals S2, S3, . . . , and SN are the same, and even in a case where any of the drive elements 161, 162, . . . , and 16N is driven, the elastic member 15 is driven so as to pressurize the whole of the pressure chamber 14 in the same manner.

Therefore, if any of the drive elements 161, 162, . . . , and 16N is driven or all thereof are driven in the same phase as the waveform of the drive signal S1, the pulsation occurs in the fluid depending on the amplitude R1 of the drive signal S1. On the contrary, if the phases of the drive signals S1, S2, . . . , and SN are different from each other, and the drive elements 161, 162, . . . , and 16N are driven, it is possible to suppress the pulsation of the fluid.

Figure 7:
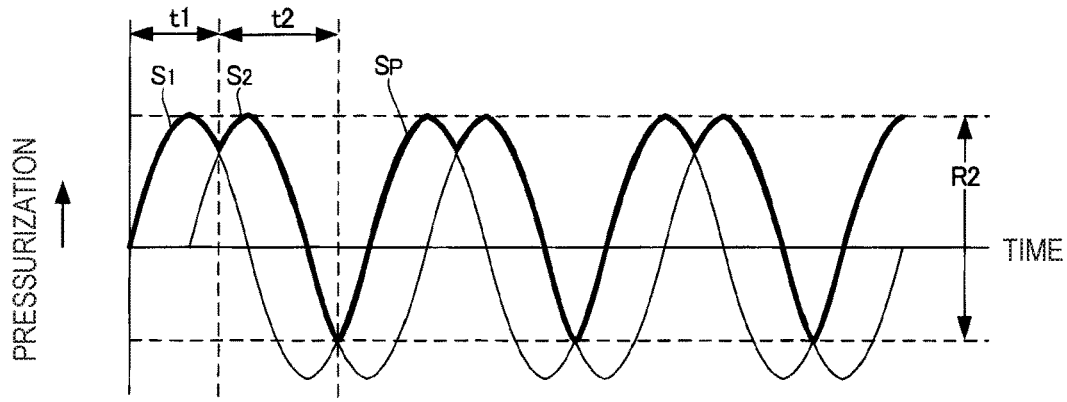
FIG. 7 is a diagram for describing two drive signals of which phase differences are different from each other.

FIG. 7 is a diagram for describing two drive signals S1 and S2 of which the phases are different from each other. For example, considered is a case where the elastic member 15 is driven by respectively supplying the first drive signal S1 and the second drive signal S2 of which the phases are different from each other as illustrated in FIG. 7 to each of two (N=2) of the first drive element 161 and the second drive element 162. As illustrated in FIG. 7, each of the drive elements 161 and 162 repeats displacement in the direction pressurizing the pressure chamber 14, and displacement in the reverse direction thereof depending on the amplitudes of the drive signals S1 and S2. At this time, for example, the first drive element 161 is displaced in the direction pressurizing the pressure chamber 14 by the first drive signal S1 at a time interval t1, and thereby, the elastic member 15 is deformed in the direction pressurizing the fluid in the inner portion of the pressure chamber 14. At the following time interval t2, the first drive element 161 is displaced in the reverse direction of the direction pressurizing the pressure chamber 14 by the first drive signal S1, but the second drive element 162 which is driven by the second drive signal S2 is driven during the displacement. Therefore, since the second drive element 162 which is driven by the second drive signal S2 is deformed in the direction pressurizing the pressure chamber 14 before the elastic member 15 is returned to the original position, the elastic member 15 is deformed again in the direction pressurizing the fluid in the inner portion of the pressure chamber 14. This is alternately repeated.

Therefore, the elastic member 15 is deformed depending on a waveform Sp of a bold line illustrated in FIG. 7, and the fluid within the pressure chamber 14 is also delivered to the channel 12 depending on the waveform Sp. Since a maximum amplitude R2 of the waveform Sp is smaller than the amplitude R1 of the drive signal S1, in comparison with the case where the first drive element 161 and the second drive element 162 are driven in the same phase as the waveform of the drive signal S1, it is possible to suppress the pulsation of the fluid. The elastic member 15 is deformed in the reverse direction of the direction pressurizing the fluid in the inner portion of the pressure chamber 14, and thereby, the fluid is supplied into the inner portion of the pressure chamber 14 from the pump 11. Accordingly, the first drive element 161 and the second drive element 162 are continuously driven by the drive signals S1 and S2 of which the phases are different from each other, and it is possible to continuously deliver the fluid in the inner portion of the pressure chamber 14 to the channel 12 at a uniform flow rate.

Figure 8:
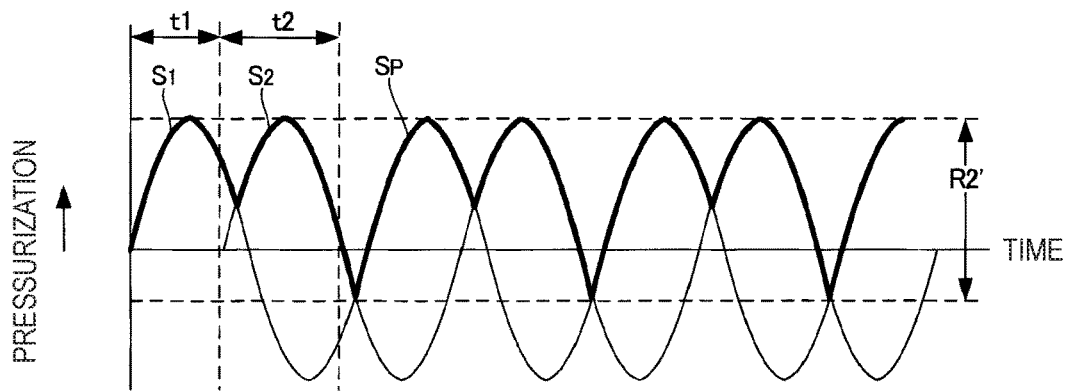
FIG. 8 is a diagram illustrating a case where the phases differences of two drive signals illustrated in FIG. 7 are changed.

Here, a case where a phase difference between two drive signals S1 and S2 described above is changed will be described. FIG. 8 is a case where the phase difference between the first drive signal S1 and the second drive signal S2 is larger than that of FIG. 7. According to FIG. 8, it is found out that the maximum amplitude R2 of the waveform Sp becomes small as the phase difference between the first drive signal S1 and the second drive signal S2 becomes large. In this manner, since it is possible to reduce the maximum amplitude R2 of the waveform Sp as the phase difference between the drive signals is large, it is possible to make the pulsation of the fluid smaller. Since the maximum amplitude R2 of the waveform Sp is equal to the amplitude R1 of FIG. 6 when no phase difference is present between the first drive signal S1 and the second drive signal S2, the maximum amplitude R2 of the waveform Sp becomes largest, and by arranging the phase difference even a little, the maximum amplitude R2 of the waveform Sp becomes smaller than the amplitude R1. Therefore, the maximum amplitude R2 of the waveform Sp becomes small as the phase difference is made larger, and becomes a half of the amplitude R1 of FIG. 6 at the time of a half cycle, and becomes smallest. The phase difference of the respective drive signals S1, S2, . . . , and SN is preferably set to a range of a half cycle (T/2) or less of the individual drive signals. In this manner, after the respective drive elements are respectively displaced in the direction pressurizing the pressure chamber 14, it is possible to pressurize the pressure chamber 14 by the following drive element within a half cycle. By quickening the switching of the drive element, it is possible to enhance an effect of suppressing the pulsation of the fluid.

Figure 9:
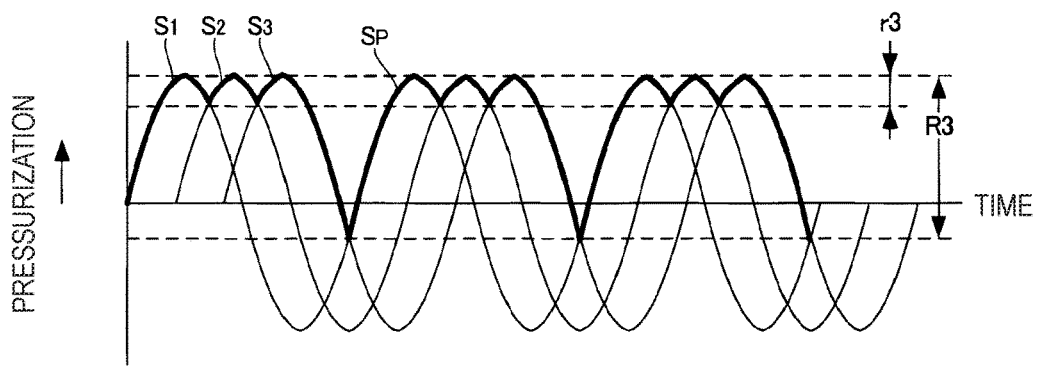
FIG. 9 is a diagram for describing three drive signals of which phase differences are different from each other.
Figure 10:
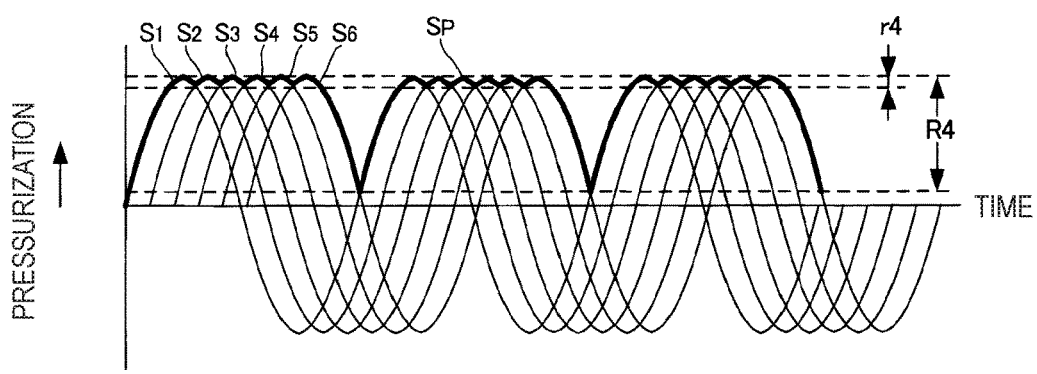
FIG. 10 is a diagram for describing six drive signals of which phase differences are different from each other.

Next, a case where the number of drive signals is increased will be described. FIG. 9 is a diagram for describing three drive signals S1, S2, and S3 of which the phases are different from each other. In this case, for example, the elastic member 15 is driven by respectively supplying the drive signals S1, S2, and S3 illustrated in FIG. 9 to each of three (N=3) drive elements 161, 162, and 163. FIG. 10 is a diagram for describing six drive signals S1, S2, . . . , and S6 of which the phases are different from each other. In this case, the elastic member 15 is driven by respectively supplying the drive signals S1, S2, . . . , and S6 to each of six (N=6) drive elements 161, 162, . . . , and 166.

The elastic member 15 is deformed depending on the waveform Sp of the bold line respectively illustrated in FIG. 9 and FIG. 10, and the fluid within the pressure chamber 14 is also delivered to the channel 12 depending on the waveform Sp. The maximum amplitude of FIG. 9 is referred to as R3, and the maximum amplitude of FIG. 10 is referred to as R4. It is found out that all of the maximum amplitude R3 of FIG. 9 (N=3) and the maximum amplitude R4 of FIG. 10 (N=6) become smaller than the maximum amplitude R2 of FIG. 7 (N=2), and the maximum amplitude R4 of FIG. 10 (N=6) becomes smaller than the maximum amplitude R3 of FIG. 9 (N=3). According to this, since it is possible to reduce the maximum amplitude of the waveform Sp indicating the movement of the elastic member 15 as the number of drive signals of which the phases are different from each other is large, it is possible to reduce the pulsation of the fluid.

Moreover, if FIG. 9 (N=3) is compared with FIG. 10 (N=6), it is found out that the amplitude r4 of FIG. 10 (N=6) becomes smaller than the amplitude r3 of the FIG. 9 (N=3) in not only the maximum amplitude of the waveform Sp but also the amplitude when the operation of the elastic member 15 is changed by the following drive signal. In this manner, the amplitude when the operation of the elastic member 15 is changed by the following drive signal becomes small as the number of drive signals is large. This is because the time at which the operation of the elastic member 15 is changed by the following drive signal becomes short, by shortening the phase difference of the respective driving signals as the number of drive signals is large. Thereby, it is possible to make the pulsation of the fluid smaller. In FIG. 9, for example, the phases of the respective drive signals S1, S2, and S3 are different from each other by the same phase difference. The case of FIG. 10 is similar thereto. In this manner, since the phases of the drive signals S1, S2, . . . , and SN which are supplied to each of three or more of drive elements 161, 162, . . . , and 16N are made to be different from each other by the same phase difference, and it is possible to uniformly suppress the change (amplitudes r3 and r4) when the drive elements which are displaced in the direction pressurizing the pressure chamber 14 are switched to each other, it is possible to enhance the effect of suppressing the pulsation of the fluid. It is not limited thereto, and the phase differences of the phases of the drive signals S1, S2, . . . , and SN which are supplied to each of three or more drive elements 161, 162, . . . , and 16N may be changed.

Figure 11:
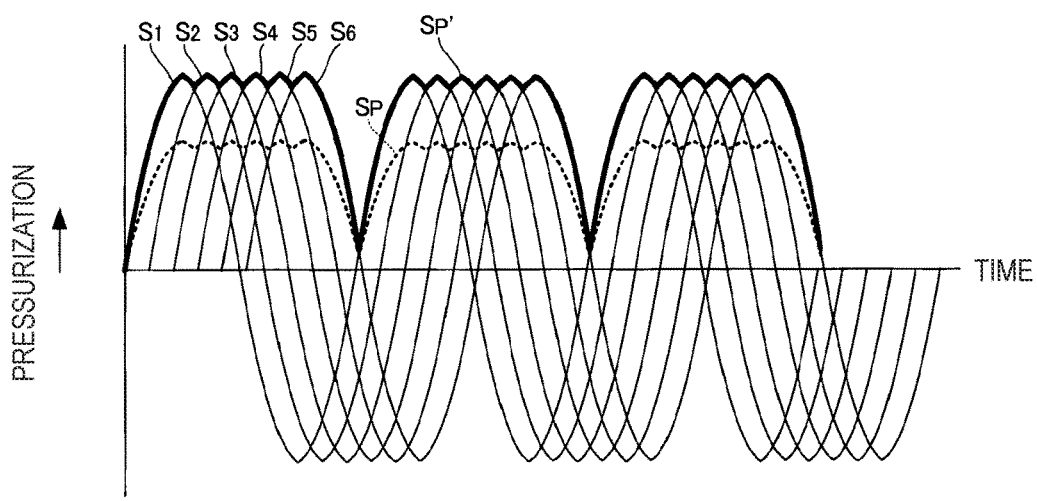
FIG. 11 is a diagram illustrating a case where amplitudes of six drive signals illustrated in FIG. 10 are changed.

By changing amplitudes of the respective drive signals S1, S2, . . . , and SN, it is possible to change the flow rate of the fluid which is delivered to the channel 12 from the pressure chamber 14. For example, FIG. 11 is a case where the amplitude is increased in comparison with FIG. 10. FIG. 11 illustrates a case where the waveform Sp of FIG. 10 is superimposed by a dotted line. An amplitude of a waveform Sp' of FIG. 10 is larger than that of the waveform Sp of FIG. 10. Therefore, since it is possible to increase the deformation of the elastic member 15 in the case of FIG. 11 in comparison with the case of FIG. 10, it is possible to increase the flow rate of the fluid which is delivered to the channel 12 from the pressure chamber 14. In contrast to FIG. 11, by reducing the amplitudes of the respective drive signals S1, S2, . . . , and SN, it is possible to reduce the flow rate of the fluid which is delivered to the channel 12 from the pressure chamber 14. According to the embodiment, it is possible to control the flow rate of the fluid by only a simple control such as changing the amplitudes of the drive signals S1, S2, . . . , and SN which are supplied to the respective drive elements 161, 162, . . . , and 16N. A flow rate sensor or the like for performing the flow rate control is not necessary. According to this, it is possible to control a flow rate ratio of the fluids which are supplied to the respective channels 12 and 12 by the respective fluid passage sections 10 and 10 by changing the amplitudes of the drive signals of the respective fluid passage sections 10. Moreover, by using micropiezo elements as the respective drive elements 161, 162, . . . , and 16N, it is possible to control the fluid rate of the fluid by a picoliter unit, and it is possible to dramatically improve the reaction control.

Furthermore, it is possible to partially drive the drive elements 161, 162, . . . , and 16N depending on the flow rate of the fluid which is delivered to the channel 12 from the pressure chamber 14. In this case, by changing the combination of the driven drive elements, it is possible to adjust the flow rate of the fluid. For example, as described above, since the maximum amplitude of the waveform Sp in the case of FIG. 9 (N=3) becomes large in comparison with that in the case of FIG. 10 (N=6), the flow rate of fluid which is delivered to the channel 12 becomes large. By using this, for example, six drive signals S1, S2, S3, S4, S5, and S6 of FIG. 10 (N=6) are divided into the drive signals S1, S3, and S5 and the drive signals S2, S4, and S6 by three, and are driven, it is possible to increase the flow rate of the fluid which is delivered to the channel 12.

As described above, in the fluid passage section 10 of the embodiment, since the phases of the drive signals S1, S2, . . . , and SN which are supplied to the respective drive elements 161, 162, . . . , and 16N are different from each other, the pressure chamber 14 is pressurized by the following drive element during the drive elements 161, 162, . . . , and 16N are displaced in the reverse direction after being respectively displaced in the direction pressurizing the pressure chamber 14. In this manner, since the drive elements are displaced one after another in the direction pressurizing the pressure chamber 14, and since it is possible to pressurize the fluid within the pressure chamber 14 while suppressing the amplitude, it is possible to effectively suppress the pulsation of the fluid. Thereby, since it is possible to perform the flow rate control of the fluid by suppressing an influence of the pulsation of the fluid, it is possible to enhance accuracy in flow rate control.

In the fluid passage section 10 according to the above embodiment, a case where the number of drive elements is the same as the number of drive signals is used as an example, but is not limited thereto, and the number of drive elements may be larger than the number of drive signals. In this case, a common drive signal may be supplied to the plurality of drive elements. According to this, by driving even more drive elements by the common drive signal, it is possible to enhance a pressurization effect of the pressure chamber 14.

Figure 12:
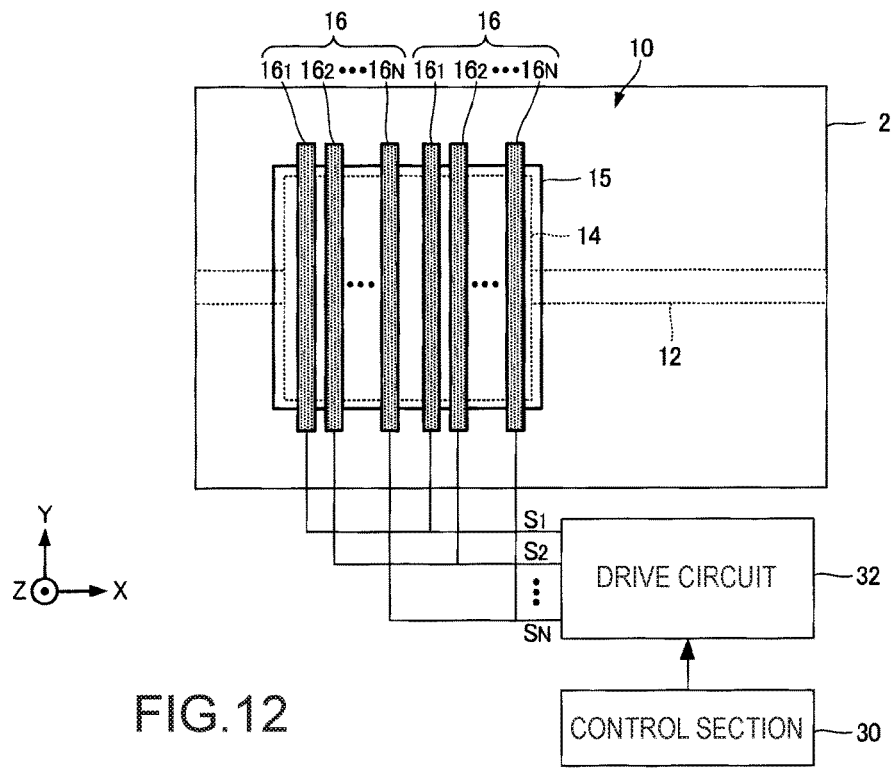
FIG. 12 is a diagram illustrating a modification example of the fluid passage section according to the embodiment.

In this case, if N (N≥2) drive elements 161, 162, . . . , and 16N are made into one group of drive elements, a plurality of groups of drive elements may be arranged on the upper surface of the elastic member 15. For example, in a modification example illustrated in FIG. 12, two groups of drive elements are arranged on the upper surface of the elastic member 15. Specifically, in the fluid passage section 10 illustrated in FIG. 12, in addition to N drive elements 161, 162, . . . , and 16N, the same number of N drive elements 161, 162, . . . , and 16N are further arranged in this sequence on the upper surface of the elastic member 15. In this case, the drive signals S1, S2, . . . , and SN may be supplied to the respective drive elements 161, 162, . . . , 16N of one side, and the drive signals S1, S2, . . . , and SN may also be supplied to the respective drive elements 161, 162, . . . , 16N of the other side.

Thereby, among the respective groups of drive elements, the common drive signal is supplied to the drive elements of the same sequence. Specifically, for example, the first common drive signal S1 is supplied to the first drive elements 161 and 161 which are equivalent to the first of the sequence, and the following second common drive signal S2 is supplied to the second drive elements 162 and 162 which are equivalent to the second of the sequence, and the following third common drive signal S3 is supplied to the third drive elements 163 and 163 which are equivalent to the third of the sequence. According to this, since it is possible to reduce the maximum amplitude of the waveform Sp in FIG. 7 to FIG. 11, it is possible to reduce the pulsation of the fluid.

The arrangement or the shape of the drive element is not limited to the above embodiment, and if it is possible to drive the elastic member 15 to change the pressure of the fluid within the pressure chamber 14, the drive element may be whatever arrangement or shape. For example, in the above embodiment, a case where the respective drive elements 161, 162, . . . , and 16N are arrayed along the direction of the channel 12 on the pressure chamber 14, and are arranged so as to be extended in a direction perpendicular to the channel 12 is used as an example, but the respective drive elements 161, 162, . . . , and 16N may be arranged so as to obliquely intersect with the channel 12. According to this, by arranging the plurality of drive elements 161, 162, . . . , and 16N so as to intersect with the channel 12, it is possible to efficiently deliver the fluid to the channel 12.

Figure 13:
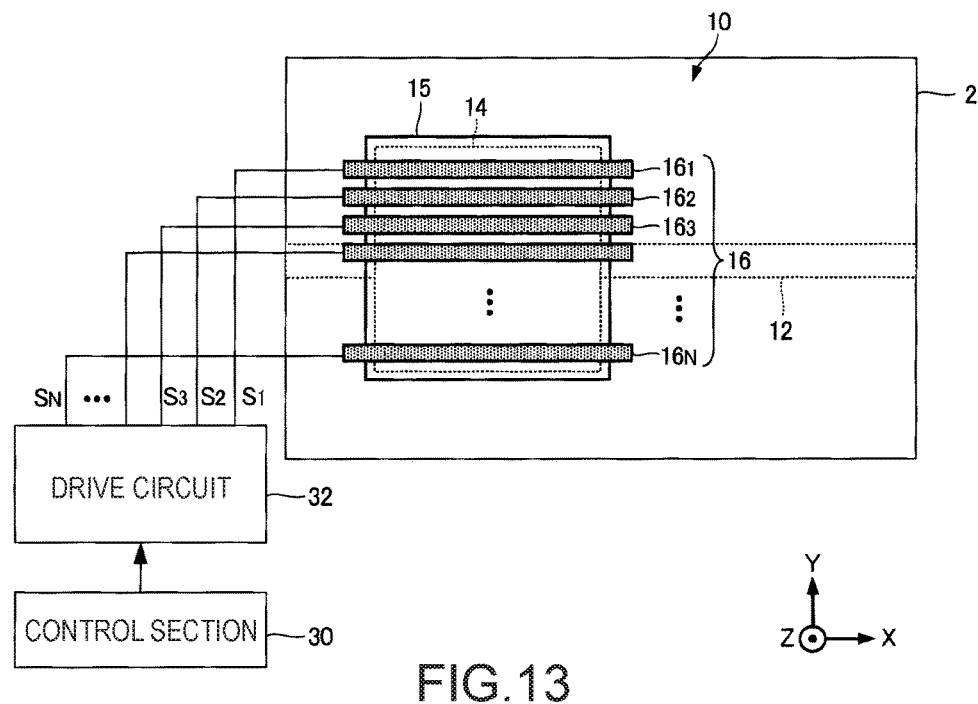
FIG. 13 is a diagram illustrating another modification example of the fluid passage section according to the embodiment.

Furthermore, as another modification example illustrated in FIG. 13, the respective drive elements 161, 162, . . . , and 16N are arrayed along a direction perpendicular to the direction of the channel 12 on the pressure chamber 14, and may be arranged so as to be extended along the channel 12. However, in all cases, it is preferable that the lengths of the respective drive elements 161, 162, . . . , and 16N be longer than the width of the pressure chamber 14. Thereby, since the drive element is arranged so as to be extended up to the outside of the pressure chamber 14, it is possible to increase the flow rate of the fluid as much as possible, and it is possible to suppress occurrence of a turbulence flow in the pressure chamber 14. The lengths of the respective drive elements 161, 162, . . . , and 16N are not limited thereto, and the respective drive elements 161, 162, . . . , and 16N may be positioned on the inside of the pressure chamber 14 in the planar view (XY plane view). Moreover, a case where all of the respective drive elements 161, 162, . . . , and 16N are configured by the same lengths is used as an example, but it is not limited thereto, and the respective drive elements 161, 162, . . . , and 16N may be configured to include the lengths which are different from each other.

What is claimed is:

1. A fluid transport apparatus comprising:
    a pressure chamber having an inner space to which a fluid is supplied;
    a plurality of drive elements that are provided directly above the pressure chamber and that are configured to deliver the fluid to a channel by changing pressure of the inner space of the pressure chamber; and
    a control section that is configured to apply a drive signal to each of the plurality of drive elements,
    wherein phases of the drive signals which are applied to two or more drive elements, respectively, among the plurality of drive elements are different from each other.

2. The fluid transport apparatus according to claim 1, wherein a phase difference between the drive signals is a half cycle or less in the same cycle.

3. The fluid transport apparatus according to claim 1, wherein phases of the drive signals which are applied to three or more drive elements, respectively, among the plurality of drive elements are different from each other by the same phase differences.

4. The fluid transport apparatus according to claim 1, wherein the control section is configured to change an amplitude of the drive signal so as to change a flow rate of the fluid which is delivered to the channel from the pressure chamber.

5. The fluid transport apparatus according to claim 1, wherein the control section is configured to apply a common drive signal to two or more other drive elements among the plurality of drive elements.

6. The fluid transport apparatus according to claim 1, further comprising:
    a first substrate where the channel is formed; and
    a second substrate that is stacked on the first substrate, the pressure chamber is formed in the second substrate,
    wherein the pressure chamber and part of the channel forms a common space so that the pressure chamber and the channel spatially communicate with each other.

7. The fluid transport apparatus according to claim 1, wherein the channel is extended in a first direction in a plan view, and
    the plurality of drive elements are arrayed along the first direction of the channel, and
    each of the plurality of drive elements is extended in a second direction intersecting with the first direction.

8. A chemical synthesis apparatus comprising:
a plurality of fluid passage members, each of the plurality of fluid passage members including:
- a pressure chamber having an inner space to which a fluid is supplied; and
- a plurality of drive elements that are provided directly above the pressure chamber and that are configured to deliver the fluid to a channel by changing pressure of the inner space of the pressure chamber;

a synthesis channel in which the channel of each of the plurality of fluid passage members converge with each other; and
a control section that is configured to apply a drive signal to the plurality of drive elements in each of the plurality of fluid passage members,
wherein in each of the plurality of fluid passage members, phases of the drive signals which are applied to two or more drive elements, respectively, among the plurality of drive elements are different from each other.

9. A method for controlling a fluid transport apparatus, the fluid transport apparatus including:
- a pressure chamber having an inner space to which a fluid is supplied; and
- a plurality of drive elements that are provided directly above the pressure chamber and that are configured to deliver the fluid to a channel by changing pressure of the inner space of the pressure chamber, the method comprising:
applying a drive signal to each of the plurality of drive elements; and
differentiating phases of the drive signals which are applied to two or more drive elements, respectively, among the plurality of drive elements.

* * * * *